Feb. 2, 1965     R. C. MARSHALL     3,168,658
DIRECT CURRENT INTEGRATING CIRCUITS
Filed March 22, 1963
FIG.1.
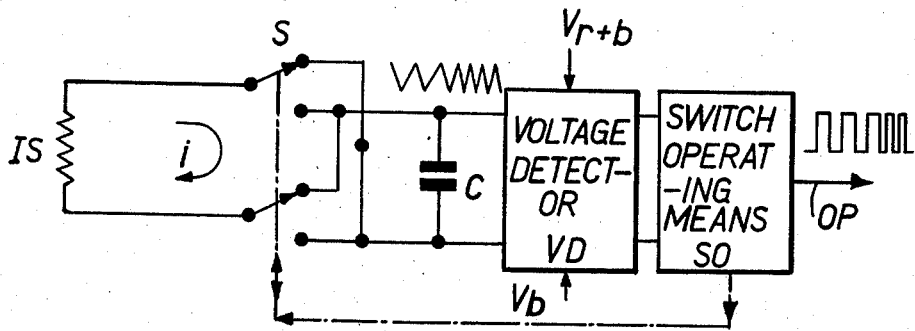
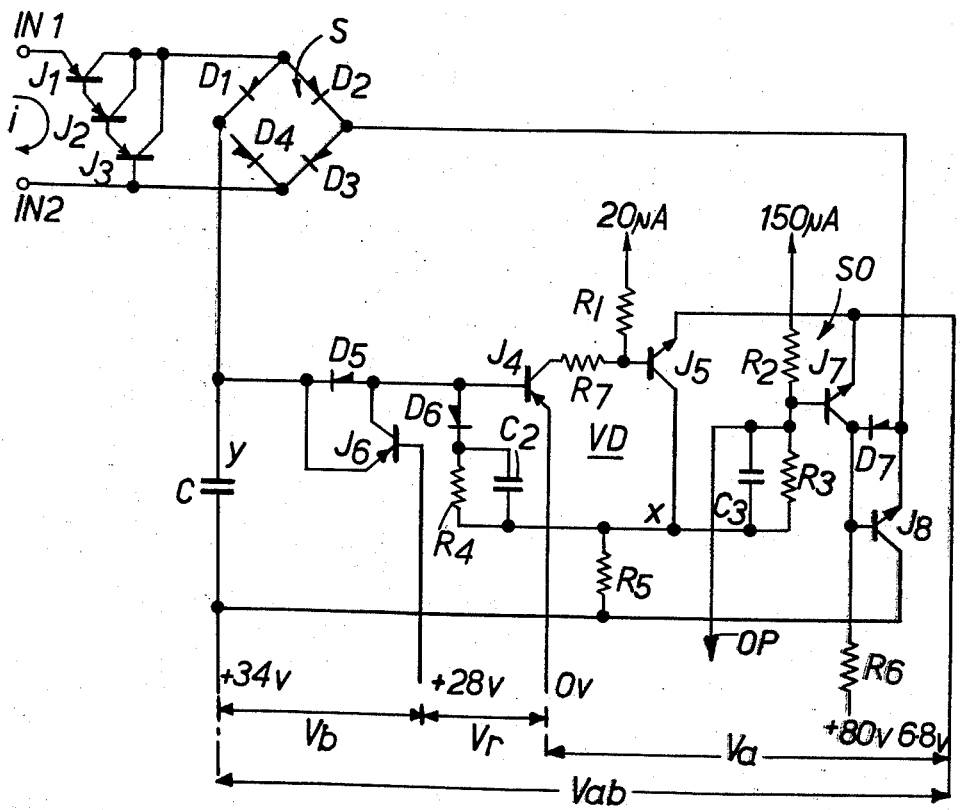
FIG.2.
Inventor
Richard Carlile Marshall
By Cushman, Darby & Cushman
Attorneys

3,168,658
DIRECT CURRENT INTEGRATING CIRCUITS
Richard Carlile Marshall, Harpenden, England, assignor to George Kent Limited, London, England, a corporation of the United Kingdom
Filed Mar. 22, 1963, Ser. No. 267,271
Claims priority, application Great Britain, Mar. 27, 1962, 11,632/62
15 Claims. (Cl. 307—88.5)

This invention relates to direct current integrating circuits and is more particularly concerned with improved arrangements for converting a direct current input signal into a train of pulses having a repetition rate proportional to the amplitude of the input current.

In accordance with one feature of the invention the input current is applied to a fixed value capacitance through reversible switch means which is controlled by voltage detecting means arranged repeatedly to sense the charge voltage on said capacitance whereby the input current is first applied to charge the capacitance up to a predetermined first reference level and is then applied in reversed direction to discharge the capacitance down to a predetermined second reference level before commencement of the next similar charge-discharge cycle, each charge-discharge cycle being marked by the generation of an output pulse.

In a preferred form of the invention the reversible switch means are of a static electronic character and conveniently take the form of a voltage controlled rectifier bridge network.

Another feature of the invention relates to the provision of means for cutting off input signals of less than a chosen amplitude whereby the device can be arranged to have a definite integration range suited to the particular practical application thereof.

A further feature of the invention is concerned with the provision of a buffer amplifier of predetermined current gain in the input circuit as an impedance matching device.

In order that the above and other features of the invention may be better understood one practical embodiment thereof will now be briefly described by way of illustrative example only and with reference to the drawing accompanying the provisional specification.

Referring first to the block schematic diagram of FIGURE 1, the input direct current $i$ from a high resistance source IS is applied through a changeover switch S to capacitance C. The voltage across the capacitance is continuously sensed by a voltage detector VD and when the charge voltage rises to a predetermined first reference level $V_{r+b}$, such voltage detector causes switch operating means SO to reverse the position of the switch S whereby the input current now discharges the capacitance. When the voltage across the capacitance falls to a predetermined second reference level $V_b$, the voltage detector VD again causes the switch operating means SO to reverse the switch S to repeat the cycle of events.

Each operation of the means SO to condition the switch S for input current flow to the capacitance C in one direction is arranged to initiate an output current pulse while every following operation of such means SO to condition the switch S for input current flow to the capacitance C in the opposite direction is arranged to terminate the pulse so that the output OP provides a continuous train of pulses at a repetition rate proportional to the amplitude of the input current $i$.

FIGURE 2 shows a circuit diagram of one practical embodiment utilizing a voltage-controlled rectifier bridge network as the switch S, a bistable circuit including complementary transistors J4, J5 as the voltage detector VD and a circuit comprising transistors J7, J8 and diode D7 as the switch operating means SO.

The input current $i$ is applied to input terminals IN1, IN2 and, by way of a buffer amplifier of cascade-connected transistors J1, J2, J3 to one diagonal of a rectifier bridge network of diodes D1, D2, D3 and D4. The transistor amplifier J1, J2, J3 forms an impedance matching device of unity current gain. The diodes D1–D4 are preferably of the silicon type to provide low leakage and high inverse voltage values.

The manner of operation is as follows. Assuming the capacitor C has been charged so that the voltage thereacross has just reached the value $B_{b+r}$ with the electrode $y$ negative. When electrode $y$ becomes more negative, diode D5 conducts and transistor J4 is turned on. Transistor J6 is at this time off in consequence of the reverse biassing of its emitter-base junction. Transistors J4, J5 are arranged in a bistable combination and when transistor J4 conducts, transistor J5 is bottomed and its collector assumes approximately the supply voltage $V_a$, i.e. $-6.8$ v. The base of transistor J7 is thereby made negative with respect to its emitter and, being of npn type, ceases to conduct.

With transistor J7 off, the voltage $V_{b+r+a}$ is isolated from the control circuit and diode D7 becomes blocked. The charge voltage VC across the capacitance C now causes the input current $i$ to flow out of such capacitance through transistor J8 (now bottomed by the bleed current from source $+80$ v., through resistance R6), diode D3, the input circuit and thence through diode D1 to the opposite side of capacitance C.

During this capacitance discharge phase, diode D5 is again cut off since VC is now less than $V_{r+b}$ but transistor J4 remains on by reason of a bias current drawn from its base through diode D6, resistance R4 and transistor J5.

When the voltage across the capacitance C falls below $V_b$ transistor J6 starts to conduct and provides part of the current through resistance R4. This causes the base current of transistor J4 to fall thereby causing transistor J5 to return to its region of linear operation. The collector voltage of transistor J5 begins to move towards 0 volts thereby further reducing the base current of the transistor and causing a regenerative shut down of both of transistors J4 and J5.

Immediately transistor J5 is cut off, the base of transistor J7 becomes positive with respect to $V_a$ ($-6.8$ v.) allowing the transistor to conduct thereby setting up a charging circuit for the capacitance C in which the input current $i$ flows through diode D2, diode D7, transistor J7 and through source $V_{b+r+a}$ to one side of the capacitance C, current flow from the other electrode of such capacitance being by way of diode D4. This commences the second phase which continues until the voltage across the capacitance C again reaches the values $V_{r+b}$ when the operation cycle described above is repeated. During the passage of the input charging current, transistor J6 is cut off when $V_c$ becomes negative with respect to $V_b$. Transistor J8 is held cut off by the biassing voltage developed across diode D7 and diode D5 remains cut off as does also diode D6 since the voltage across resistance R5 is sufficient only to supply the base current of transistor J7 plus 150 micro-amps through resistance R2. The voltage at point X is therefore less than $V_{r+b}$ and it is impossible for transistor J4 to recommence conduction while these conditions prevail. The capacitors C2, C3 provide a low impedance shunt across the resistances R4, R3 during the switching operations.

When the input current is less than a critical value switching will cease at the end of the next discharge phase. This occurs because although J6 may be conducting, the input cannot provide a big enough proportion of the bias current flowing through R4 in order to trigger the voltage detecting means. The value of input current at which the device ceases to switch is pre-selectable by a suitable choice of the value of R4 since the latter determines the magnitude of the bias current. By this means the device may be arranged to have a defined integration range of, say, 10:1 for inputs corresponding to flow obtained from a differential pressure cell or, say, 100:1 for inputs from a magnetic flow transmitter.

The output OP from the connection point of the base of transistor J7 to the resistor network R2, R3 may be too rapid for direction operation of, say electromechanical counters. In such circumstances a number of binary dividing stages may be provided. It is desirable that the final pulse rate shall represent some convenient unit or fractional value of the measured variable which is itself represented by the input current. This may be achieved by appropriate choice of the value of the capacitance C and the division ratio of any dividing stages which may be provided.

The reference voltage $V_r$ governs the rate of pulse generation for a given value of input current $i$ and must be derived from a stable source. The other voltage supplies are preferably stabilized also to maintain consistent operation. Temperature effects may be made largely self-cancelling as by the choice of a capacitor having a negative temperature co-efficient for the capacitance C and a Zener diode of positive temperature co-efficient governing the reference power supply.

Although one particular arrangement has been described in some detail, it will be apparent that many changes may be made without departing from the invention. For example an alternative form of the switch S could comprise a multiple transistor arrangement.

What is claimed is:

1. A direct current integrating circuit comprising reversible switch means for applying an input current to a fixed value capacitance, voltage detecting means arranged repeatedly to sense the charge voltage on the capacitance and means controlled by the detecting means for operating the reversible switch means initially to apply the input current to charge the capacitance up to a predetermined reference level and subsequently to apply the input current in reverse direction to discharge the capacitance down to a predetermined second reference level before commencement of a following charge-discharge cycle, the switch operating means being arranged to initiate an output pulse to mark each charge-discharge cycle.

2. A direct current integrating circuit according to claim 1 wherein said reversible switch means comprise a semi-conductor network.

3. A direct current integrating circuit according to claim 2 wherein said semi-conductor network comprises a rectifier bridge network controlled by a switching voltage in series with said rectifier bridge network and said capacitance.

4. A direct current integrating circuit according to claim 1 and including means for inhibiting operation of the reversible switch means for signals of less than a selected amplitude.

5. A direct current integrating circuit according to claim 4 in which said inhibiting means comprise voltage detecting means, which bias current inhibits operation of the reversible switch means unless the input current is comparable with or exceeds the bias current, said bias current being arranged so as not to affect the rate at which the capacitance charges and discharges during the major part of each cycle.

6. A direct current integrating circuit according to claim 1, including means for amplifying the input current to the reversible switch means, said amplifying means comprising at least one transistor connected to provide a predetermined current gain and a high output impedance.

7. A direct current integrating circuit according to claim 1, including means for providing an output of reduced pulse repetition frequency which may be applied to a suitable counter for displaying, in convenient units, a time integral of a measured variable, represented by the input current.

8. An integrating circuit as claimed in claim 1 in which the voltage detecting means comprise a pair of complementary transistors arranged in a bistable configuration.

9. A direct current integrating circuit comprising reversible switch means for applying an input current to a fixed value capacitance, said reversible switch means being constituted by a semi-conductor network, voltage detecting means arranged repeatedly to sense the charge voltage on the capacitance and means controlled by the detecting means for operating the reversible switch means initially to apply the input current to charge the capacitance up to a predetermined reference level and subsequently to apply the input current in reverse direction to discharge the capacitance down to a predetermined second reference level before commencement of a following charge-discharge cycle, the switch operating means being arranged to initiate an output pulse to mark each charge-discharge cycle.

10. A direct current integrating circuit comprising reversible switch means for applying an input current to a fixed value capacitance, said reversible switch means being constituted by a rectifier bridge network, controlled by a switching voltage in series with said bridge network, voltage detecting means arranged repeatedly to sense the charge voltage on the capacitance and means controlled by the detecting means for operating the reversible switch means initially to apply the input current to charge the capacitance up to a predetermined reference level and subsequently to apply the input current in reverse direction to discharge the capacitance down to a predetermined second reference level before commencement of a following charge-discharge cycle, the switch operating means being arranged to initiate an output pulse to mark each charge-discharge cycle.

11. A direct current integrating circuit comprising reversible switch means for applying an input current to a fixed value capacitance, said reversible switch means being constituted by a rectifier bridge network controlled by a switching voltage in series with said bridge network and said capacitance, voltage detecting means arranged repeatedly to sense the charge voltage on the capacitance and means controlled by the detecting means for operating the reversible switch means initially to apply the input current to charge the capacitance up to a predetermined reference level and subsequently to apply the input current in reverse direction to discharge the capacitance down to a predetermined second reference level before commencement of a following charge-discharge cycle, means for inhibiting operation of the reversible switch means for signals of less than a selected amplitude, the switch operating means being arranged to initiate an output pulse to mark each charge-discharge cycle.

12. A direct current integrating circuit according to claim 11 wherein said inhibiting means comprise means for applying a bias current to the input of the voltage detecting means, which current inhibits operation of the reversible switch means unless the input current is comparable with or exceeds the bias current, said bias current being arranged so as not to affect the rate at which the capacitance charges and discharges during the major part of each cycle.

13. A direct current integrating circuit comprising reversible switch means for applying an input current to a fixed value capacitance, said reversible switch means being constituted by a rectifier bridge network controlled by a switching voltage in series with said bridge network and said capacitance, voltage detecting means arranged repeatedly to sense the charge voltage on the capacitance and means controlled by the detecting means for operating the reversible switch means initially to apply the input current to charge the capacitance up to a predetermined reference level and subsequently to apply the input current in reverse direction to discharge the capacitance down to a predetermined second reference level before commencement of a following charge-discharge cycle, means for inhibiting operation of the reversible switch means for signals of less than a selected amplitude, the switch operating means being arranged to initiate an output pulse to mark each charge-discharge cycle, and means for amplifying the input current to the reversible switch means, said amplifying means comprising at least one transistor connected to provide a predetermined current gain and a high output impedance.

14. A direct current integrating circuit comprising reversible switch means for applying an input current to a fixed value capacitance, said reversible switch means being constituted by a rectifier bridge network controlled by a switching voltage in series with said bridge network and said capacitance, voltage detecting means arranged repeatedly to sense the charge voltage on the capacitance and means controlled by the detecting means for operating the reversible switch means initially to apply the input current to charge the capacitance up to a predetermined reference level and subsequently to apply the input current in reverse direction to discharge the capacitance down to a predetermined second reference level before commencement of a following charge-discharge cycle, means for inhibiting operation of the reversible switch means for signals of less than a selected amplitude, the switch operating means being arranged to initiate an output pulse to mark each charge-discharge cycle, means for amplifying the input current to the reversible switch means, said amplifying means comprising at least one transistor connected to provide a predetermined current gain and a high output impedance, and means for providing an output of reduced pulse repetition frequency which may be applied to a suitable counter for displaying in convenient units the time integral of a measured variable represented by the input current.

15. A direct current integrating circuit according to claim 14 wherein the voltage detecting means comprise a pair of complementary transistors arranged in a bistable configuration.

No references cited.

ARTHUR GAUSS, *Primary Examiner.*